(No Model.) 2 Sheets—Sheet 1.
A. WARTH.
LUBRICATOR.
No. 345,558. Patented July 13, 1886.
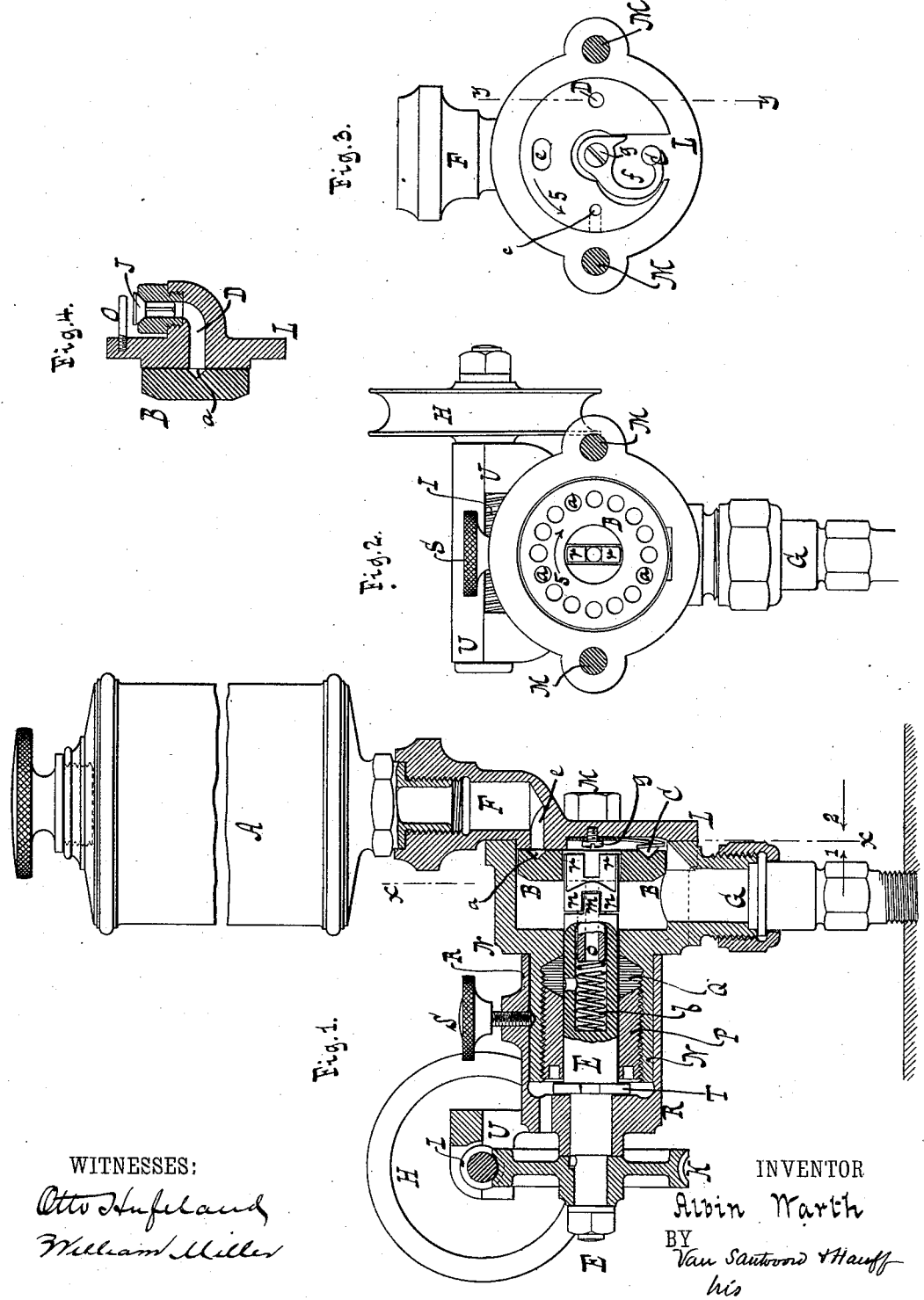
WITNESSES:
Otto Hufeland
William Miller
INVENTOR
Albin Warth
BY Van Santwood & Hauff
his ATTORNEYS

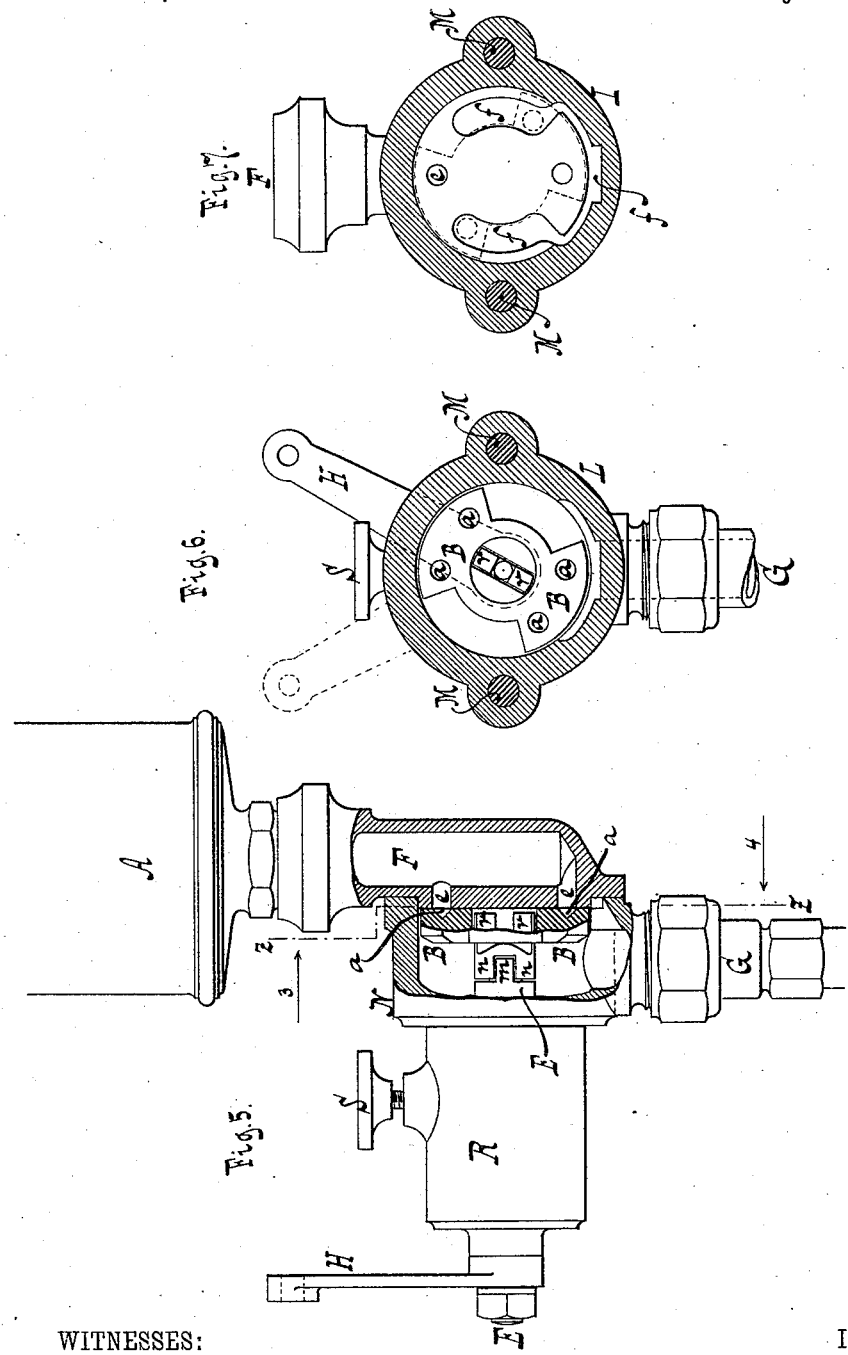

UNITED STATES PATENT OFFICE.

ALBIN WARTH, OF STAPLETON, NEW YORK.

LUBRICATOR.

SPECIFICATION forming part of Letters Patent No. 345,558, dated July 13, 1886.

Application filed September 10, 1885. Serial No. 176,702. (No model.)

*To all whom it may concern:*

Be it known that I, ALBIN WARTH, a citizen of the United States, residing at Stapleton, in the county of Richmond and State of New York, have invented new and useful Improvements in Lubricators, of which the following is a specification.

This invention relates to improvements in lubricators or conveyers; and the object of the invention is to secure an automatic discharge or distribution of lubricating material or fluid in such a manner that the lubricating material or fluid will be applied at the proper periods of time and in suitable quantities as required.

The device will be found very useful for supplying or conveying lubricating material or fluid to any cylinder or receptacle the contents of which are under pressure.

In the drawings, Figure 1 is a side elevation, partly in section, of a lubricator containing my invention. Fig. 2 is a section in the plane $x\ x$, Fig. 1, looking in the direction shown by arrow 2. Fig. 3 is a section in the plane $x\ x$, Fig. 1, looking in the direction shown by arrow 1. Fig. 4 is a section in the plane $y\ y$, Fig. 3. Fig. 5 is a side elevation, partly in section, of a modification. Fig. 6 is a section in the plane $z\ z$, Fig. 5, looking in the direction shown by arrow 4. Fig. 7 is a section in the plane $z\ z$, Fig. 5, looking in the direction shown by arrow 3.

Similar letters indicate corresponding parts.

The letter A indicates a supply or reservoir suitable for containing oil or lubricating material. From the supply or reservoir A the lubricant passes through a pipe or conduit, F, and through one or more channels or passages, $e$, to a conveyer, B.

In the example shown in Figs. 1 to 4, both inclusive, the conveyer B consists of a ring or disk of metal or other suitable material, provided with cavities or recesses $a\ a$. If desired, however, the conveyer B, instead of being in the shape of a disk or ring, may be of any desirable or suitable form.

The conveyer B (shown in Figs. 1 to 4, inclusive) is caused to revolve in the direction shown by arrow 5, Figs. 2 and 3. Means for causing the conveyer B to revolve will be hereinafter described.

When one of the recesses $a$ passes by the channel or one of the channels $e$, said recess $a$ becomes filled with oil or lubricating material, and said oil or lubricant is carried away from the channel $e$ by the revolution of the conveyer B. As the conveyer B sits closely against the cap or cover L, said recess $a$ retains the oil or lubricant which has entered therein until said recess $a$ comes opposite a cavity or chamber, $f$, in the cover L, when the lubricant can flow out of said recess $a$ through the chamber $f$ and into the conduit G. The conduit or pipe G can carry the lubricant to any part of a machine which it is desired to keep constantly lubricated—as, for example, the piston of the steam-engine. The cap or cover L can be made to support the supply or reservoir A, and said cover L can be held to the shell or support N by screws M or other suitable means.

To insure the outflow of the oil from the recesses $a$, I can provide an ejector. The ejector may consist of a nipple or projection, C, mounted on a yielding or spring arm secured by a screw, $g$, or suitable means, in a suitable position—as, for example, in the cavity or chamber $f$ in the cover L. When a recess, $a$, of the conveyer B is carried in proximity to the projection C, said projection C passes into the recess $a$, and forces the lubricant therein contained out of said recess $a$, which lubricant can then pass through the conduit or duct G to the part to be lubricated. In case the conduit G leads, for example, to a cylinder or steam-chest of a steam-engine, to a conduit G and chamber $f$ are liable to be filled with steam, and the recesses $a$, after being emptied of lubricating material, are also liable to become filled with steam. To remove the steam from the recesses $a$, I can provide an exhaust, D. The exhaust D, Figs. 3 and 4, can consist of a passage or channel leading into the open air, and when the recesses $a$ are passing the exhaust D the steam can leave the recesses $a$ and pass off through the exhaust D. The recesses $a$ are thus free to be charged with lubricating material as soon as said recesses come into communication with the supply A—that is, when passing the channel $e$.

In some instances it may occur that the lubricant employed has a tendency to adhere within the recesses $a$, as may be the case, for example, with some varieties of oil. In order to loosen the lubricant within the recesses $a$, an agitator, $c$, Fig. 3, can be employed. The agitator $c$, in the example shown, consists of a channel, which is formed in the cap or cover L, and which leads from the chamber $f$ to the conveyer B. As the conveyer B moves and the recesses $a$ are being carried past the channel $c$, steam from the chamber $f$, passing through the channel $c$, strikes against the lubricant in the recesses $a$ and agitates or loosens the lubricant, so that the lubricant is free to flow out of the recesses $a$ when the recesses $a$ are passing by the chamber or cavity $f$.

It will be understood that the conveyer B sits closely against the cap or cover L, so that the recesses $a$ are covered or closed except when passing by the channel $c$, agitator $c$, chamber $f$, and exhaust D. The exhaust D can be provided with a valve, J, which allows a free exit from the exhaust D, but which valve prevents air or foreign matter from entering the exhaust. A stop, O, can be provided to prevent displacement or removal of the valve J, and said valve J, as shown in the drawings, Fig. 4, may be a simple gravity-valve which rises and falls to open or close the exhaust D. Any suitable and well-known construction of valve may, however, be applied.

To impart motion to the conveyer B, a wheel or pulley, H, can be employed, which wheel H is rotated by any suitable mechanism. The axle of the wheel H is shown as provided with a screw-thread, I, which engages with another screw-thread, or with cogs or teeth which may be formed on the periphery of a wheel, K. Said wheel K is thus rotated by the rotation of the actuating-wheel H, and the rotation of the wheel K rotates the axle E and the conveyer B, said conveyer being in connection with the axle E.

To compensate for wear of the conveyer B, and to secure a close contact between the conveyer B and the cover or cap L, the conveyer B can be connected to the axle E in such manner as to revolve with the axle E, but so that the conveyer B can move longitudinally independently of the axle E. By providing the axle E with one or more lugs or ears, $m$, which engage with one or more corresponding recesses in a head, $n$ $n$, said head $n$ $n$ is free to move a certain distance longitudinally independently of the axle E; but said head $n$ $n$ revolves with the axle E. By providing the conveyer B with an oblong or angular opening for the reception of a correspondingly-shaped end or lugs, $r$ $r$, of the head $n$ $n$, the conveyer B is free to move a certain distance longitudinally while revolving with the head $n$ $n$. The head $n$ $n$ can be provided with a shank or arm, $o$, entering a recess or hollow in the axle E, Fig. 1. In this recess or hollow can be placed a spring, $b$, which spring tends to force the head $n$ $n$, and with it the conveyer B, toward the cover or seat L. If desired, however, the head $n$ $n$, can be dispensed with and the conveyer B can be mounted directly on the shaft E, so as to turn with the shaft E, but so that the conveyer B is free to move a certain distance longitudinally independently of the shaft E. In this case the spring $b$ could be made to press directly on the conveyer B, and the shaft E would be made of sufficient length to enable the conveyer B to sit closely to its seat without coming out of engagement with the shaft E. The conveyer B is thus held closely against the cover or seat L, and wear of the conveyer B is compensated for by the spring $b$ moving the conveyer B toward the cover L as said conveyer B wears away.

In case the device is applied to a cylinder or receptacle containing fluid under pressure, such fluid presses against the conveyer B and forces said conveyer against its seat L, thus assisting the spring $b$ in securing a close contact between the conveyer B and its seat L. Of course the conveyer B, instead of having an opening for the entry of the lugs $r$ $r$, may be provided with a lug or lugs, which enter corresponding recesses in the head $n$ $n$ or shaft E. By unscrewing or removing the bolts or fastenings M the cover L can be removed, and the conveyer B, head $n$ $n$, and spring $b$ can then be easily taken out of the device, if desired for any purpose—as, for example, cleaning or repairing.

To secure a tight seat for the axle E, said axle may be surrounded by packing or soft material Q, which packing can be tightly compressed about the axle E by a screw, P, which screw P can be inserted into a suitable opening tapped for its reception in the support or base N of the device. Any suitable form of stuffing-box can be employed to secure a tight seat for the axle E, and steam, fluid, or other matter which passes through the conduit G is thus prevented from escaping along the axle E.

By providing the axle E with a shoulder, T, said axle E is prevented from being inserted into the support N farther than is necessary. A cap or cover, R, which may be made in the form of a shell, can be placed upon the support N, and fixed thereon by a screw, S, or other suitable means. The cap R prevents the axle E from being removed from the device, the shoulder T of the axle E striking against the cap R. The axle E is thus longitudinally fixed; but said axle E is free to revolve. The cap R can be made to form the bearings for the axle of the actuating-wheel H, and to form such bearing said cap R may be provided with an arm or projection, U.

In place of the conveyer B being formed in the shape of a disk, said conveyer B may be formed with an arm or arms provided with recesses $a$, Fig. 6, and said conveyer B, instead of being actuated or revolved by a wheel, H, as shown in Fig. 1, may receive an oscillating or back-and-forth motion from a lever or arm, H, or other suitable means, as indicated in Figs. 5 and 6. The lever or arm H can be keyed or firmly connected to the axle E.

In the example shown in Figs. 5 and 6 the conveyer B has two pairs of recesses, $a$, and the lubricant from the supply A passes through the conduit F and channels $e\ e$ to the recesses $a$. When the conveyer B is in the position indicated by the full lines designating the lever H in Fig. 6, one pair of recesses $a\ a$ is in communication with the channels $e\ e$, and said pair of recesses becomes filled with lubricating material. When the conveyer B oscillates to the position indicated by the dotted lines of the lever H in Fig. 6, the pair of recesses which before was in communication with the supply-channels $e\ e$ passes away from said supply-channels, and the lubricant in said pair of recesses $a\ a$ flows or is emptied into the chamber $f$ in the cover L, Fig. 7, while the other pair of recesses $a$ is brought into communication with the supply-channels $e$. On the conveyer B swinging or moving back to the position of lever H, (indicated in Fig. 6 by full lines,) the second pair of recesses $a$ communicates with the chamber $f$, while the first pair of recesses $a$ communicates with the supply-channels $e$. In Fig. 7 the conveyer B is indicated by dotted outlines.

The device above described, as will be seen, delivers the lubricant in small quantities to the chamber $f$, or to the conduit G, from whence said lubricant passes to any part where it may be required. The operation of the device being automatic, it is merely required to keep a supply of the lubricant in the reservoir A, when said lubricant will be applied at the proper times and in proper quantities. As the conveyer B can be made to convey comparatively small quantities of lubricant at a time, the supply of lubricant in the reservoir A can be made to serve effectively for a considerable period of time.

The construction shown in the drawings is advantageous, in that it provides a flat-faced conveyer sitting against a flat seat, whereby an air-tight seat for the conveyer B is secured, while at the same time the conveyer B is free to operate or revolve. The conveyer B also prevents steam or fluid from the conduit G from entering into the reservoir A. The reservoir or supply A, in the construction shown in the drawings, can also be closed air-tight, thus preventing the lubricant from passing out at any point, excepting at the conduit F, and guarding against loss of the lubricant, while at the same time dirt or foreign matter is prevented from entering the reservoir.

What I claim as new, and desire to secure by Letters Patent, is—

1. The combination, with a supply or reservoir, of a conveyer, cavities in the face of said conveyer, and an ejector-finger constructed to engage said cavities, substantially as set forth.

2. The combination, with a supply or reservoir, of a conveyer, an ejector, and an exhaust, substantially as set forth.

3. The combination, with a supply or reservoir, of a conveyer, an ejector, an arm or shaft, E, and a spring, $b$, substantially as set forth.

4. The combination, with a supply or reservoir, of a conveyer and an auxiliary steam-jet, $c$, substantially as set forth.

5. The combination, with a supply or reservoir, of a conveyer, an ejector, and an agitator, substantially as set forth.

6. The combination, with a supply or reservoir, of a conveyer, an exhaust, and an agitator, substantially as set forth.

7. The combination, with a supply or reservoir of a conveyer, an agitator, an ejector, and an exhaust, substantially as set forth.

8. The combination, with a conveyer and an actuating-shaft having lugs $m$, of the recessed head $n$, for securing an engagement between said conveyer and shaft, substantially as set forth.

9. The combination of a supply-reservoir, a conveyer having cavities $a\ a$, an ejector adapted to engage said cavities, the conduit F, having channels $e$, leading to said conveyer, the conduit G, leading from the conveyer, the shaft E and the head $n$, and spring $b$, for holding said shaft and conveyer in engagement, substantially as set forth.

10. The combination of the flat-faced conveyer B, having oil-cavities $a\ a$ and steam-jet opening $c$, the cover L, having a chamber, $f$, the conduit F, having channels $e$, leading to the cavities in the conveyer, the ejector C, to engage said cavities, and the conduit G, leading from said conveyer, substantially as set forth.

11. The combination of the recessed conveyer B, having steam-opening $c$, the oil-conduits F G, the ejector C, and the exhaust D, substantially as set forth.

12. The combination of the shaft E, having lugs $m$, the recessed conveyer B, the seat or cover L, the recessed head $n$, having lugs $r\ r$ and shank $o$, and the spring $b$, substantially as set forth.

13. The combination of the rotary conveyer B, having a longitudinal movement on its axis, the shaft E, having wheel K, the screw I, and the wheel or pulley H, substantially as set forth.

14. The combination of the conveyer B, conduits F G, shaft E, casing N, packing Q, and screw P, substantially as set forth.

15. The combination of the casing N, conveyer B, shaft E, having shoulder T, and the cap or cover R, substantially as set forth.

In testimony whereof I have hereunto set my hand and seal in the presence of two subscribing witnesses.

ALBIN WARTH. [L. S.]

Witnesses:
HENRY WARTH,
E. F. KASTENHUBER.